United States Patent
Arnett et al.

(10) Patent No.: US 8,583,306 B2
(45) Date of Patent: Nov. 12, 2013

(54) METHOD FOR CONTROLLING TORQUE OUTPUT OF A HYBRID POWERTRAIN SYSTEM

(75) Inventors: Michael Arnett, Naperville, IL (US); Krunal P. Patel, Sterling Heights, MI (US); Sean W. McGrogan, Ann Arbor, MI (US); Adam J. Heisel, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 160 days.

(21) Appl. No.: 13/152,380

(22) Filed: Jun. 3, 2011

(65) Prior Publication Data

US 2012/0310455 A1    Dec. 6, 2012

(51) Int. Cl.
*B60L 11/00* (2006.01)
*B60W 20/00* (2006.01)

(52) U.S. Cl.
CPC .................................. *B60W 20/00* (2013.01)
USPC ........................... 701/22; 180/65.275; 701/54

(58) Field of Classification Search
USPC .................. 701/22, 23, 54, 123; 180/65.265, 180/65.275, 65.285, 65.8; 903/903, 930, 903/906
See application file for complete search history.

(56) References Cited

U.S. PATENT DOCUMENTS

| | | | |
|---|---|---|---|
| 6,543,414 B2 * | 4/2003 | O'Neil et al. ................. | 123/350 |
| 7,275,518 B1 * | 10/2007 | Gartner et al. ........... | 123/406.23 |
| 7,315,774 B2 * | 1/2008 | Morris ............................ | 701/53 |
| 7,704,185 B2 * | 4/2010 | Babcock et al. .................. | 477/3 |
| 8,126,604 B2 * | 2/2012 | McGrogan et al. ............. | 701/22 |
| 8,133,151 B2 * | 3/2012 | Hsieh et al. ....................... | 477/3 |
| 8,261,864 B2 * | 9/2012 | Bhattarai et al. ......... | 180/65.285 |
| 8,265,815 B2 * | 9/2012 | McGrogan et al. ............. | 701/22 |
| 2009/0112412 A1 * | 4/2009 | Cawthorne et al. ............. | 701/54 |
| 2009/0118945 A1 * | 5/2009 | Heap et al. ...................... | 701/54 |
| 2009/0118948 A1 * | 5/2009 | Heap et al. ...................... | 701/55 |

OTHER PUBLICATIONS

Christopher Grant, "Finding the Derivative of Experimental Data", Aug. 26, 1996, accessed Dec. 26, 2012, available at http://chemlabs.uoregon.edu/GeneralResources/pdf/derivtext.pdf.*
U.S. Appl. No. 13/029,381, not pub'd., Michael Arnett.
U.S. Appl. No. 13/160,937, not pub'd., Jy-Jen F. Sah.
U.S. Appl. No. 13/160,908, not pub'd., Sean W. McGrogan.
U.S. Appl. No. 13/161,584, not pub'd., Sean W. McGrogan.
U.S. Appl. No. 13/161,602, not pub'd, Jy-Jen F. Sah.
U.S. Appl. No. 13/152,380, not pub'd, Michael Arnett.
U.S. Appl. No. 13/162,720, not pub'd, Ryan D. Martini.
U.S. Appl. No. 13/163,668, not pub'd, Anthony H. Heap.
U.S. Appl. No. 13/163,115, not pub'd, Jy-Jen F. Sah.
U.S. Appl. No. 13/162,767, not pub'd, Sean McGrogan.
U.S. Appl. No. 13/151,327, not pub'd., Ganley.

(Continued)

*Primary Examiner* — Fadey S. Jabr
*Assistant Examiner* — Martin Weeks

(57) ABSTRACT

A method for controlling output torque of a hybrid powertrain system includes determining a constrained output torque in response to an operator torque request, and determining maximum and minimum output torque limits. A time-rate change in the constrained output torque at each of a plurality of torque breakpoints is determined. A desired output torque is determined. A preferred output torque is determined as the desired output torque adjusted using the time-rate changes in the constrained output torque at the plurality of torque breakpoints and limited within the maximum and minimum output torque limits. Torque outputs of torque generators of the hybrid powertrain system are controlled in response to the preferred output torque.

9 Claims, 2 Drawing Sheets

(56) References Cited

OTHER PUBLICATIONS

U.S. Appl. No. 13/152,380, not pub'd., Arnett.

U.S. Appl. No. 13/151,373, not pub'd., Haggerty.
U.S. Appl. No. 13/152,328, not pub'd, Whitney.
U.S. Appl. No. 13/170,428, not pub'd, Wang.

* cited by examiner

METHOD FOR CONTROLLING TORQUE OUTPUT OF A HYBRID POWERTRAIN SYSTEM

TECHNICAL FIELD

This disclosure is related to powertrain systems including electric-powered torque machines and electric power control schemes.

BACKGROUND

The statements in this section merely provide background information related to the present disclosure. Accordingly, such statements are not intended to constitute an admission of prior art.

Vehicle systems include powertrain systems that provide output torque for propulsion. Powertrain systems include hybrid systems, all-electric systems, and extended-range electric systems that may be configured to operate in various operating modes to generate and transfer torque to a driveline. Such powertrain systems use torque-generative devices, clutches and transmissions. Torque-generative devices may include internal combustion engines and electrically-powered motor/generators, i.e., electric machines. Known electric machines interact with energy storage devices, e.g., high-voltage batteries. Known high-voltage batteries include those fabricated from lithium-ion cells. Known energy storage device devices configured to store electric energy on-vehicle include high-voltage electrical cells and ultracapacitors, among others.

Known parameters associated with monitoring an energy storage device include a state-of-charge, current, and voltage. Available battery power describes battery power limits that include an allowable range between minimum and maximum allowable battery power levels. Allowable battery power limits are preferably established at threshold levels to prevent either overcharging or overdischarging of an energy storage device. Exceeding allowable battery power limits may result in damage that reduces service life of an energy storage device. It is known that overaggressive limitations in the allowable battery power limits may result in underutilization, with attendant reduction in output torque generated using electric power. In hybrid powertrain systems and extended-range electric systems, there may be a corresponding increase in output torque generated using an internal combustion engine and an associated increase in fuel consumption.

Known hybrid controls systems determine commanded output torque by subjecting an operator torque request to system constraints that include motor torque limits, battery power limits, and clutch torque limits. When an output torque request violates any of the limits, the output torque is modified to protect the hardware. Such operation may not be consistent with minimizing fuel consumption or achieving optimal fuel economy. Known control schemes control the output torque to optimize battery power and/or minimize fuel consumption, with a torque determination control scheme that determines an output torque that consumes optimum battery power. A battery power-based optimum output torque may differ from an operator torque request. When a battery power-based optimum output torque is used as a commanded output torque, drivability may be negatively affected.

SUMMARY

A method for controlling output torque of a hybrid powertrain system includes determining a constrained output torque in response to an operator torque request, and determining maximum and minimum output torque limits. A time-rate change in the constrained output torque at each of a plurality of torque breakpoints is determined. A desired output torque is determined. A preferred output torque is determined as the desired output torque adjusted using the time-rate changes in the constrained output torque at the plurality of torque breakpoints and limited within the maximum and minimum output torque limits. Torque outputs of torque generators of the hybrid powertrain system are controlled in response to the preferred output torque.

BRIEF DESCRIPTION OF THE DRAWINGS

One or more embodiments will now be described, by way of example, with reference to the accompanying drawings, in which.

DETAILED DESCRIPTION

Figure 1:
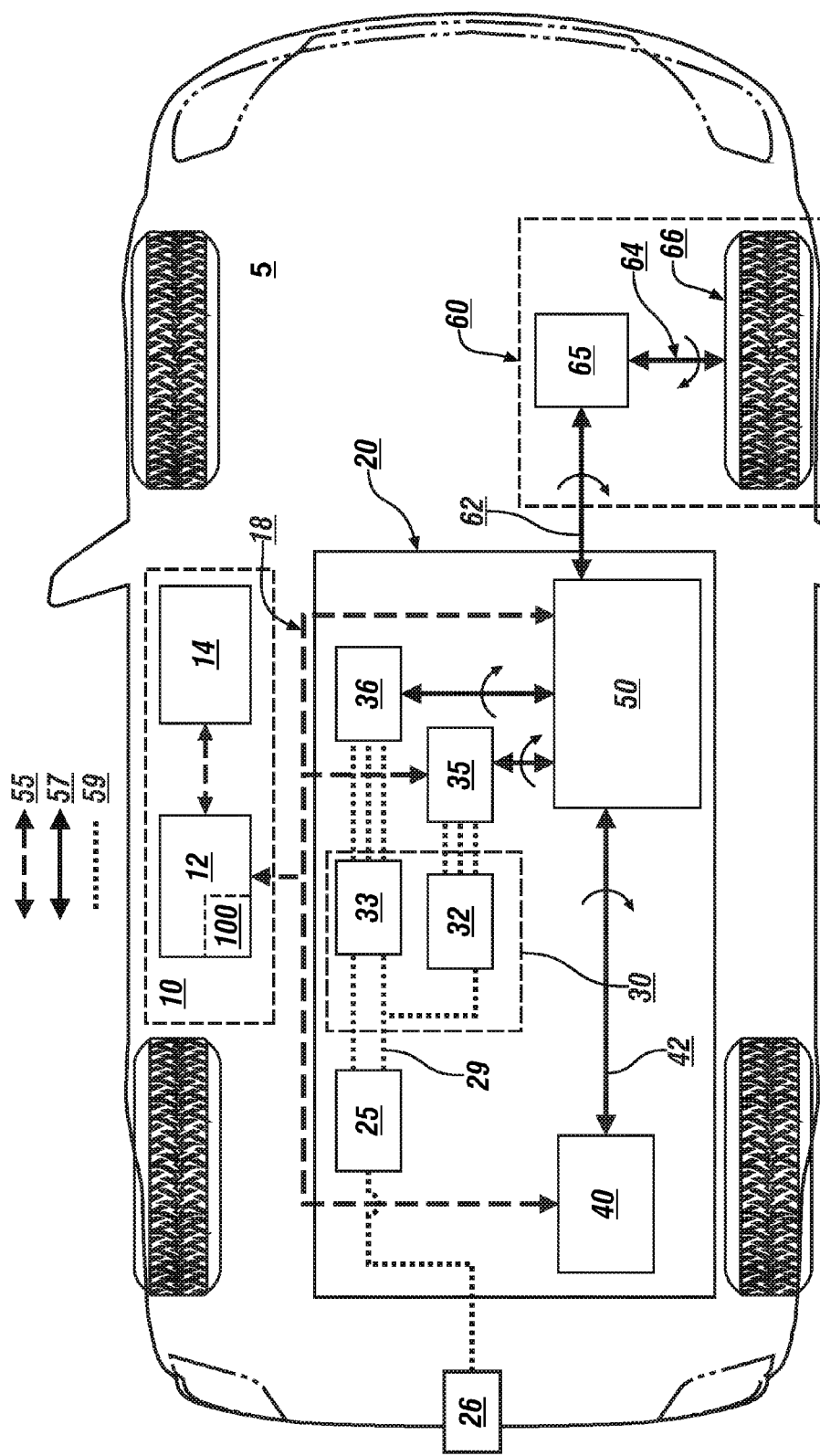
FIG. 1 illustrates an embodiment of a vehicle including a hybrid powertrain system coupled to a driveline and controlled by a control system in accordance with the disclosure.

Referring now to the drawings, wherein the showings are for the purpose of illustrating certain exemplary embodiments only and not for the purpose of limiting the same, FIG. 1 schematically shows vehicle 5 including an embodiment of a hybrid powertrain system 20 coupled to a driveline 60 and controlled by a control system 10. Like numerals refer to like elements throughout the description. The hybrid powertrain system 20 may be configured as any one of a battery-electric system (EV), an extended-range electric system (EREV), an electric-hybrid system including one of a series-hybrid system, a parallel-hybrid system, and a compound-hybrid system, or another configuration without limitation. The embodiment of the vehicle 5 including the hybrid powertrain system 20 is illustrative.

The hybrid powertrain system 20 employs communications paths 55, mechanical power paths 57, and high-voltage electric power paths 59. The mechanical power paths 57 mechanically couple elements that generate, use, and/or transfer torque, including such elements as an internal combustion engine 40, first and second electrically-powered torque machines 35 and 36, respectively, a transmission 50, and driveline 60. The high-voltage electric power paths 59 electrically connect elements that generate, use, and/or transfer high-voltage electric power, including such elements as an energy storage device 25, an inverter module 30, and the first and second electrically-powered torque machines 35 and 36. The high-voltage electric power paths 59 include a high-voltage DC bus 29.

The communications path 55 may include direct data transfer lines and high-speed data transfer lines to effect communications within the control system 10 and effect communications between the control system 10 and elements of the vehicle 5. The communications path 55 may include one or more of a direct analog connection, a digital connection, a serial peripheral interface (SPI) bus, and a high-speed communications bus 18 that may include a controller area network, i.e., a CAN bus.

The engine 40 is preferably a multi-cylinder direct fuel injection internal combustion engine that converts fuel to mechanical power through a combustion process. The engine 40 is equipped with a plurality of sensing devices and actuators configured to monitor operation and deliver fuel to form a combustion charge to generate torque. In one embodiment, the engine 40 is configured to operate as a spark-ignition engine with timing of combustion and the associated engine torque being controlled by advancing or retarding spark ignition timing. In one embodiment the engine 40 is configured as a spark-ignition direct-injection (SIDI) engine that operates in either a spark-ignition (SI) combustion mode or a controlled auto-ignition (HCCI) combustion mode. Alternatively, the engine 40 is configured to operate as a compression-ignition engine with timing of combustion and the associated engine torque controlled by advancing or retarding timing of fuel injection events. The engine 40 is configured to execute autostart and autostop control schemes and fuel cut-off (FCO) control schemes during ongoing operation of the vehicle system 5. By way of definition, the engine 40 is considered to be in an OFF state when it is not being fueled and is not spinning. The engine 40 is considered to be in an FCO state when it is spinning but is not being fueled.

The first and second torque machines 35 and 36 preferably include multi-phase electric motor/generators electrically connected to the inverter module 30 that are configured to convert stored electric energy to mechanical power and convert mechanical power to electric energy that may be stored in the energy storage device 25. The first and second torque machines 35 and 36 have limitations in power outputs in the form of torque and rotational speeds.

The inverter module 30 includes first and second inverters 32 and 33 that electrically connect to the first and second torque machines 35 and 36, respectively. The first and second torque machines 35 and 36 interact with the respective first and second inverters 32 and 33 to convert stored electric energy to mechanical power and convert mechanical power to electric energy that may be stored in the energy storage device 25. The first and second electric power inverters 32 and 33 are operative to transform high voltage DC electric power to high-voltage AC electric power and also operative to transform high voltage AC electric power to high-voltage DC electric power. Electric power originating in the first torque machine 35 may be transferred electrically to the energy storage device 25 via the inverter module 30 and the high-voltage bus 29 and to the second torque machine 36 via the inverter module 30. Electric power originating in the second torque machine 36 may be transferred electrically to the energy storage device 25 via the inverter module 30 and the high-voltage bus 29 and to the first torque machine 35 via the inverter module 30 and the high-voltage bus 29. Monitored electric power associated with the energy storage device 25, the inverter module 30 and the high-voltage bus 29 include current and voltage. Monitored outputs from the first and second torque machines 35 and 36 include torques and rotational speeds.

The transmission 50 preferably includes one or more differential gear sets and activatable clutch components to effect torque transfer between the engine 40, the first and second torque machines 35 and 36, and an output member 62 that couples to the driveline 60. In one embodiment the transmission 50 is a two-mode transmission device configured to operate in conjunction with the first and second torque machines 35 and 36 to transfer torque in one of two or more distinct gear trains referred to as Mode 1 and Mode 2 in one embodiment. The two or more distinct gear trains referred to as Mode 1 and Mode 2 may include either or both fixed gear operation and continuously variable operation.

The driveline 60 may include a differential gear device 65 that mechanically couples to an axle 64 or half-shaft that mechanically couples to a wheel 66 in one embodiment. The differential gear device 65 is coupled to the output member 62 of the hybrid powertrain system 20, and transfers output power therebetween. The driveline 60 transfers tractive power between the transmission 50 and a road surface.

Mechanical power originating in the engine 40 may be transferred via an input member 42 to the first torque machine 35 and to the output member 62 via the transmission 50. Mechanical power originating in the first torque machine 35 may be transferred to the engine 40 via the transmission 50 and the input member 42, and may be transferred to the output member 62 via the transmission 50. Mechanical power originating in the second torque machine 36 may be transferred via the transmission 50 to the output member 62. Mechanical power may be transferred between the transmission 50 and the driveline 60 via the output member 62.

The energy storage device 25 may be any energy storage device, e.g., a high-voltage battery. One exemplary energy storage device 25 is a high-voltage battery fabricated from a plurality of lithium-ion cells. It is appreciated that the energy storage device 25 may include a plurality of electrical cells, ultracapacitors, and other electrochemical devices configured to store energy and provide electric energy on-vehicle. When the energy storage device 25 is a high-voltage battery, it is electrically connected via the high-voltage bus 29 to the inverter module 30 that connects to the first and second torque machines 35 and 36 to transfer electric power therebetween. In one embodiment, an external connector 26 electrically connects to the high-voltage battery 25 and is connectable to an external AC power source to provide electric power for charging the high-voltage battery 25.

Parameters associated with the energy storage device 25 include a state-of-charge (SOC), temperature, available voltage, and available battery power, each of which is monitored by the control system 10. The available battery power describes battery limits that include an allowable range between maximum and minimum allowable battery powers, described as a maximum battery power (Pbat_max) and a minimum battery power (Pbat_min), respectively. It is appreciated that the battery power is measured in terms of parameters that may be regularly monitored, including e.g., battery current and battery voltage, and may be measured in kilowatts (kW). The allowable battery power limits are preferably established at threshold levels to prevent either overcharging or overdischarging of the energy storage device 25 that may result in damage that reduces service life thereof.

An electric power management system may be either a charge-depleting system or a charge-sustaining system. The terms charge-depleting system and charge-sustaining system define and indicate an operating strategy for using and managing stored electric power in a vehicle, e.g., an embodiment of the vehicle 5 during a key-on cycle. During a key-on cycle, a charge-depleting system preferentially generates output torque exclusively using the torque machines until the SOC of the energy storage device 25 is less than a predetermined threshold, at which time an internal combustion engine is activated to generate torque for either or both output torque and electric power generation. During a key-on cycle, a charge-sustaining system generates output torque using both the engine and the torque machines, with the intent of maintaining the SOC of the energy storage device 25 within a predetermined range during the entire key-on cycle, and with the intent that the SOC at the end of the key-on cycle is substantially the same as the SOC at the beginning of the key-on cycle. Magnitudes of threshold states described herein are determined and correspond to whether the electric power management system is a charge-depleting system or a charge-sustaining system.

The control system 10 includes a control module 12 that signally connects to an operator interface 14. The operator interface 14 is used to collectively indicate a plurality of human/machine interface devices through which the vehicle operator commands operation of the vehicle 5. It is appreciated that human/machine interface devices may include, e.g., an ignition switch to enable an operator to crank and start the engine 40, an accelerator pedal, a brake pedal, and a transmission range selector, i.e., PRNDL. Vehicle operator commands include an operator torque request that indicates an operator request for a magnitude of output torque delivered to the driveline 60 to effect vehicle acceleration. It is appreciated that vehicle acceleration includes positive and negative acceleration events.

The control module 12 signally connects to sensing devices of each of the energy storage device 25, the inverter module 30, the first and second torque machines 35 and 36, the engine 40, and the transmission 50. The control module 12 operatively connects to actuators of the inverter module 30 including the first and second inverters 32 and 33, the engine 40, and the transmission 50 either directly or via the communications bus 18 to control operation thereof in accordance with executed control schemes that are stored in the form of routines and calibrations, including control scheme 100.

The control module 12 is illustrated as a single, unitary element for ease of depiction. The control module 12 preferably has a distributed architecture including a plurality of control modules. The functions described as being performed by the control module 12 may be combined into one or more control modules. Preferably a master control module device oversees and directs operations of individual control modules of the distributed architecture that are associated with the individual control modules. The individual control modules may be assigned to and may be physically located near one of the energy storage device 25, the inverter module 30, the first and second torque machines 35 and 36, the engine 40, and the transmission 50 to monitor and control operation thereof. As such, individual control modules of the control module 12 may directly signally connect to individual sensing devices and directly operatively connect to individual actuators, including the energy storage device 25, the inverter module 30, the first and second torque machines 35 and 36, the engine 40, and the transmission 50 to monitor and control operation thereof.

Communications between the master control module device and individual control modules of the control module 12, and between the individual control modules and individual ones of the energy storage device 25, the inverter module 30, the first and second torque machines 35 and 36, the engine 40, and the transmission 50 are accomplished using the communications paths 55 including the communications bus 18. Communicated messages may be in the form of sensor signals and actuator commands using communications protocols associated with the specific elements of the communications path 55, e.g., serial communications. The communications protocols for the high-speed communications bus 18 preferably includes executing communications in a structured manner by periodically sending messages, e.g., on a 12.5 ms loop cycle.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
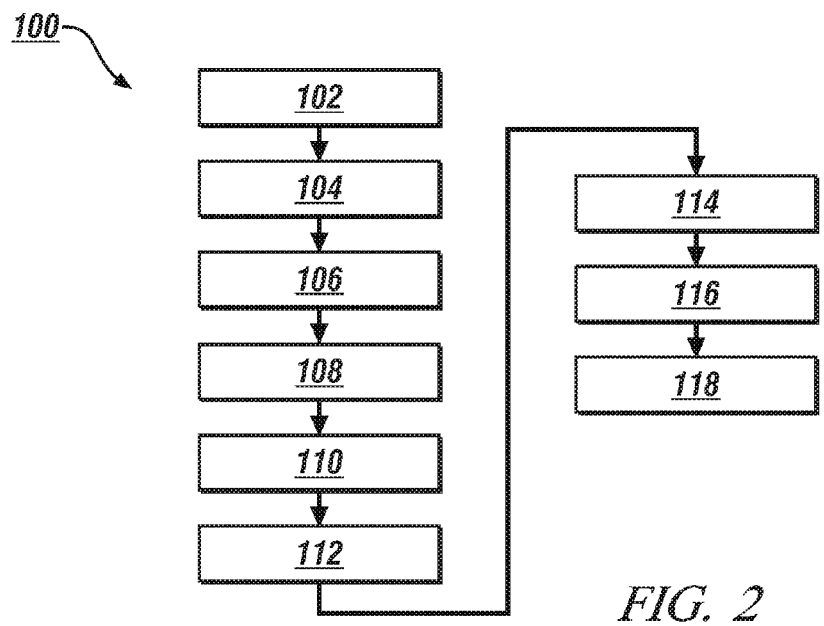
FIG. 2 illustrates a control scheme in flowchart form for controlling and managing output torque of a hybrid powertrain system in response to an operator torque request in accordance with the disclosure.

FIG. 2 schematically shows details of the control scheme 100 in flowchart form for controlling and managing output torque of a hybrid powertrain system in response to an operator torque request. The output torque of the hybrid powertrain system is generated by an internal combustion engine in conjunction with one or a plurality of torque machine(s). The control scheme 100 is described with reference to the vehicle 5 including the hybrid powertrain system 20 controlled by the control system 10 of FIG. 1. It is appreciated that the vehicle 5 and hybrid powertrain system 20 are illustrative of one embodiment, and the concepts described herein may be applied to other hybrid powertrain systems that employ an internal combustion engine and one or a plurality of torque machine(s) to generate output torque.

Figure 3:
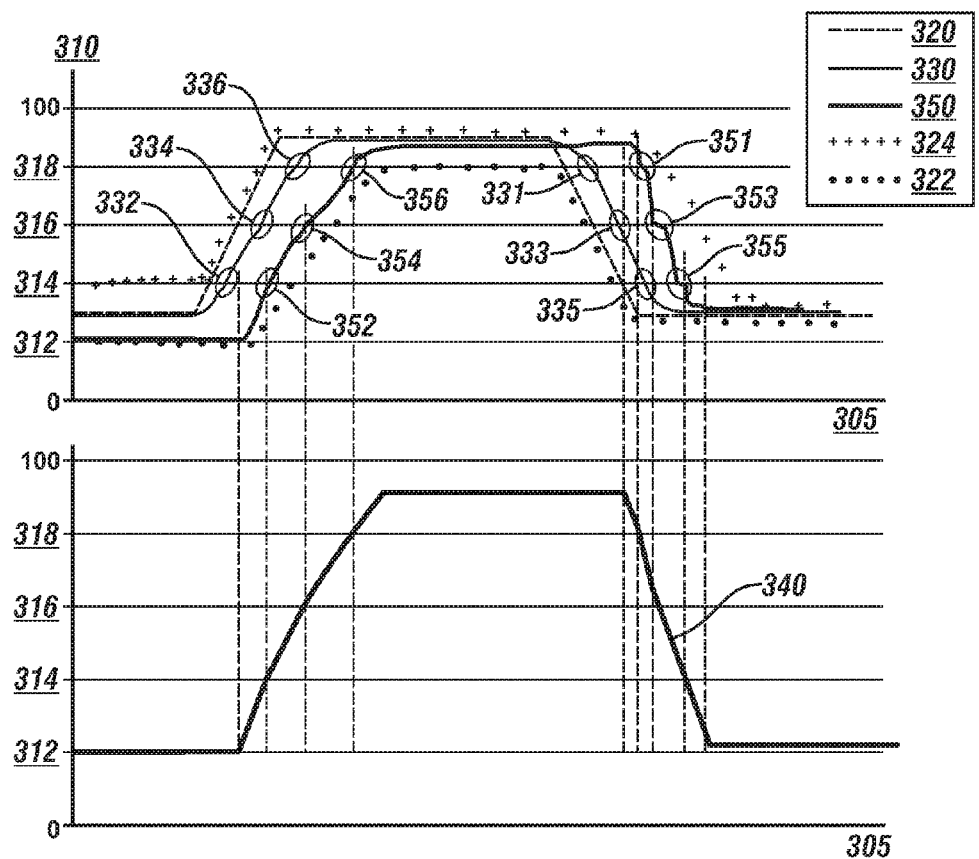
FIG. 3 illustrates relative magnitude of achievable torque in relation to elapsed time for a plurality of torque parameters described with reference to FIG. 2 in accordance with the disclosure.

FIG. 3 graphically shows relative magnitude of achievable torque (%) 310 in relation to elapsed time 305 for a plurality of torque parameters described herein with reference to FIG. 2. Table 1 is provided as a key wherein the numerically labeled blocks and the corresponding functions are set forth as follows.

TABLE 1

| BLOCK | BLOCK CONTENTS |
|---|---|
| 102 | Monitor Treq |
| 104 | Determine To__const in response to Treq |
| 106 | Determine To__min, To__max |
| 108 | Divide To__const into i torque breakpoints between a minimum achievable output torque and a maximum achievable output torque |
| 110 | Calculate $\Delta To/\Delta t$ at each of the i torque breakpoints for To__const |
| 112 | Determine OptTo(FE) |
| 114 | Adjust OptTo(FE) using $\Delta To/\Delta t$ calculated at the i torque breakpoints |
| 116 | Determine To__final using OptTo(FE) adjusted by $\Delta To/\Delta t$ calculated at the i torque breakpoints and limited within To__min, To__max |
| 118 | Control Te, Tm in response to To__final |

Execution of the control scheme 100 includes the following steps, preferably executed in order. An operator torque request (Treq) is ongoingly monitored (102). An exemplary operator torque request is shown in FIG. 3 as line 320.

A constrained output torque (To_constr) is determined by subjecting the operator torque request to system constraints (104). System constraints preferably include maximum and minimum torque limits for the torque machine(s), maximum and minimum battery power limits, maximum clutch torque limits, and others. If the operator torque request 320 causes the hybrid powertrain system to violate any of the aforementioned system constraints, the output torque is constrained to protect component(s) associated with the constraint that may be violated, i.e., the torque machine(s), battery, and clutches. Such constraints are known. The constrained output torque (To_constr) is determined in response to the operator torque request with response time delays introduced to accommodate engine response delays including manifold delays and output torque constraints and limitations that accommodate battery power limits and system constraints. The constrained output torque is shown in FIG. 3 as Line 330.

The manifold delays associated with fill times and other dynamics are considered in determining the constrained output torque. An internal combustion engine is unable to respond infinitely fast due at least in part to air transport lag. It is appreciated that as an engine throttle opens or closes, there is a time delay prior to a resulting increase or decrease in crankshaft torque. Such time delays must be accounted for. System delays are introduced by saving the last 20 constrained driver output torque request values. In one embodiment, the system delays are a set of simple calibrations that are associated with powertrain operating conditions. One condition includes setting the time delays to zero under conditions wherein engine torque and an operator torque request must be delivered to respond to transient events occurring in the system, such as during transmission gear shift events, engine autostarts and engine autostops. One condition includes setting the time delays to calibrated values when the torque machine(s) is providing torque assistance. One condition includes setting the time delays to calibrated values when the torque machine(s) is not providing torque assistance and the output torque is being modified in response to an optimum battery power.

Minimum and maximum output torque limits associated with the operator torque request are determined (To_min, To_max) (106). Exemplary minimum and maximum output torque limits are shown in FIG. 3 as lines 322 and 324, respectively. The minimum and maximum output torque limits are employed to limit output torque to achieve a preferred battery power usage. Initially, the minimum and maximum output torque limits are calculated by adding and subtracting torque offsets from a delayed version of the constrained operator torque request. These torque offsets are preferably a set of calibrations based on output speed and certain powertrain conditions. One condition includes setting the torque offsets to zero under conditions wherein engine torque and an operator torque request must be delivered in response to transient events occurring in the system, such as during transmission gear shift events, engine autostarts and engine autostops. One condition includes setting the torque offsets to calibrated values when the torque machine(s) is providing torque assistance. One condition includes setting the torque offsets to calibrated values when the torque machine(s) is not providing torque assistance and the output torque is being modified in response to an optimum battery power. During transitions, rate-limits are applied to the torque offsets in order to make transition less harsh from a drivability perspective.

The constrained output torque is analyzed with reference to magnitude of achievable output torque, preferably on a scale of 0% to 100% of the achievable output torque. This includes dividing the output torque into a quantity of i torque breakpoints between a minimum achievable output torque and a maximum achievable output torque (108). The minimum and maximum achievable output torques are defined with reference to the capability of the powertrain system 20. The torque breakpoints are created by selecting specific torque levels between achievable output torques of 0% and 100%, with one of the i torque breakpoints selected every 10% of the achievable output torque, i.e., at 10%, 20%, 30% . . . 90%. Example torque breakpoints are shown as iso-torque lines 312, 314, 316, and 318 corresponding to achievable output torque levels of 20%, 40%, 60% and 80% in FIG. 3. Other breakpoints may be selected.

The constrained output torque is analyzed, including calculating a time-rate change in the constrained output torque at each of the i torque breakpoints (110). This preferably includes determining a change in torque in relation to a change in time for each of the i breakpoints for an increasing torque request ($\Delta inc(i)$) and for a decreasing torque request ($\Delta dec(i)$). These are shown as elements 332, 334, and 336 corresponding to achievable torque levels of 40%, 60% and 80% for the increasing torque request in FIG. 3, and elements 331, 333, and 335 correspond to achievable torque levels of 80%, 60%, and 40% for the decreasing torque request in FIG. 3.

A desired output torque in response to the operator torque request (OptTo(FE)) is determined and is shown as line 340 in FIG. 3 (112). In one embodiment, the desired output torque in response to the operator torque request is an output torque associated with an optimum fuel economy for operating the hybrid powertrain system 20 in response to the operator torque request. A desired output torque associated with an operating parameter other than an optimum fuel economy for operating the hybrid powertrain system 20 in response to the operator torque request may be used with similar effect. The output torque associated with an optimum fuel economy corresponds to an optimum battery power for operating the hybrid powertrain system 20 in response to the operator torque request. In one embodiment, the optimum battery power is a minimum battery power that is required to achieve the output torque, and accounts for converting between mechanical torque and electric power in terms of efficiency and power loss without considering other system constraints such as clutch limits.

The desired output torque in response to the operator torque request is adjusted at each of the i breakpoints with the corresponding change in the constrained output torque in relation to the change in time (114). The adjustments including the corresponding changes in the constrained output torque in relation to the change in time are shown as elements 352, 354, and 356, which correspond to torque levels of 40%, 60% and 80% for the increasing torque request in FIG. 3, and shown as elements 351, 353, and 355, which correspond to torque levels of 80%, 60%, and 40% for the decreasing torque request in FIG. 3. Thus, the constrained output torque is shaped.

A final torque command (To_final) is determined, and includes the output torque associated with optimum fuel economy for operating the hybrid powertrain system 20 in response to the operator torque request adjusted at each of the i breakpoints with the corresponding change in the constrained output torque in relation to the change in time, rate-limited within the minimum and maximum output torque limits (116). The final output torque command including the operator torque request that has been constrained, shaped, and rate-limited, is shown as line 350 in FIG. 3.

Torque commands for the engine (Te) and the electric machine(s) (Tm) are generated using torque distribution control schemes in response to the final torque command and used to control operation of the hybrid powertrain system 20 (118).

By way of definition, maximum levels for battery power and current are associated with electrical discharging, and minimum levels for battery power and current are associated with electrical charging.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A control module-implemented method for controlling output torque of a hybrid powertrain system, comprising:
    determining a constrained output torque in response to an operator torque request;
    determining maximum and minimum output torque limits;
    determining a time-rate change in the constrained output torque at each of a plurality of torque breakpoints, comprising dividing the constrained output torque into a plurality of torque breakpoints between a minimum achievable output torque and a maximum achievable output torque and calculating a time-rate change in the constrained output torque at each of the plurality of torque breakpoints;
    determining a desired output torque;
    determining a preferred output torque comprising the desired output torque adjusted using the time-rate changes in the constrained output torque at the plurality of torque breakpoints limited within the maximum and minimum output torque limits; and
    employing the control module to control torque outputs of torque generators of the hybrid powertrain system in response to the preferred output torque.

2. The method of claim 1, wherein determining the maximum and minimum output torque limits comprises determining the maximum and minimum output torque limits based on the operator torque request.

3. The method of claim 1, wherein determining the desired output torque comprises determining an output torque associated with optimum fuel economy for operating the hybrid powertrain system in response to the operator torque request.

4. The method of claim 1, wherein determining the preferred output torque comprises rate-limiting the desired output torque.

5. A control module-implemented method for controlling output torque of a hybrid powertrain system, comprising:
    determining a constrained output torque in response to an operator torque request;
    determining maximum and minimum output torque limits;
    determining a time-rate change in the constrained output torque at each of a plurality of torque breakpoints, comprising dividing the constrained output torque into a plurality of torque breakpoints between a minimum achievable output torque and a maximum achievable output torque and calculating a time-rate change in the constrained output torque at each of the plurality of torque breakpoints;
    determining a desired output torque for fuel economy;
    determining a preferred output torque comprising the desired output torque for fuel economy adjusted using the time-rate changes in the constrained output torque at the plurality of torque breakpoints limited within the maximum and minimum output torque limits; and
    employing the control module to control torque outputs of torque generators of the hybrid powertrain system in response to the preferred output torque.

6. The method of claim 5, wherein determining the maximum and minimum output torque limits comprises determining the maximum and minimum output torque limits based on the operator torque request.

7. The method of claim 5, wherein determining the desired output torque for fuel economy comprises determining an output torque associated with optimum fuel economy corresponding to an optimum battery power for operating the hybrid powertrain system in response to the operator torque request.

8. The method of claim 5, wherein determining the preferred output torque comprises rate-limiting the desired output torque.

9. A control module-implemented method for controlling a hybrid powertrain system, comprising:
    adjusting a desired output torque using time-rate changes in a constrained output torque at a plurality of torque breakpoints and limited within maximum and minimum output torque limits, comprising
    dividing the constrained output torque into a plurality of torque breakpoints between a minimum achievable output torque and a maximum achievable output torque,
    calculating a time-rate change in the constrained output torque at each of the plurality of torque breakpoints, and
    adjusting the desired output torque using the time-rate change in the constrained output torque calculated at each of the plurality of torque breakpoints; and
    employing the control module to control torque outputs of torque generators of the hybrid powertrain system in response to a preferred output torque determined in response to the desired output torque adjusted using time-rate changes in the constrained output torque at the plurality of torque breakpoints and limited within the maximum and minimum output torque limits.

* * * * *